United States Patent Office 2,810,651
Patented Oct. 22, 1957

2,810,651
STABILIZATION OF ORGANIC COMPOUNDS

Ralph B. Thompson and Ted Symon, Hinsdale, Ill., assignors to Universal Oil Products Company, Des Plaines, Ill., a corporation of Delaware No Drawing. Application December 28, 1954,
Serial No. 478,199

12 Claims. (Cl. 99—163)

This is a continuation-in-part of our copending application Serial No. 394,518, filed November 25, 1953, and relates to the stabilization of organic compounds which tend to deteriorate in storage or in use due to oxidation or other reactions.

The novel method of the present invention may be utilized for the stabilization of various organic materials which are unstable in storage, during treatment and/or in use, including motor fuel and still more particularly unsaturated gasolines as cracked gasoline, polymer gasoline, etc., aviation gasoline, jet fuel, diesel oil, heater oil, mineral oil, lubricating oil, fuel oil, drying oil, greases, waxes, rubber, edible fats and oils, forage crops, monomers including styrene, butadiene, isoprene, acetylenes, etc., various unsaturated alcohols, acids, ketones, etc. These materials are adversely affected by oxygen, with the resultant formation of undesirable gum, discoloration, rancidity or other deleterious reaction products.

The invention is particularly applicable to the stabilization of fatty materials, including edible fats and oils, which may be of animal, vegetable or mineral origin and which tend to become rancid, especially during long periods of storage prior to use. Typical representatives of the edible fats and oils include linseed oil, menhaden oil, cod liver oil, castor oil, oliver oil, rapeseed oil, coconut oil, palm oil, corn oil, sesame oil, peanut oil, babassu oil, butter, fat, lard, beef tallow, etc. It is understood that other oils and fats may be treated within the scope of the present invention, including oils and fats which previously have been subjected to various treatments such as hydrogenation, blowing with air, heat treatment, etc.

In another embodiment the present invention may be applied to the treatment of crops by dusting or spraying in order to preserve food accessory factors such as carotene, vitamins, various fatty acids, alcohols, etc. In still another embodiment the present invention may be used for the stabilization of solid food products by dusting, spraying, injecting, soaking, etc. In still another embodiment the inhibitor may be incorporated in materials which contact food products as, for example, paraffin wax used to coat containers for food products, cardboard or other paper products used for packaging food products, etc.

In one embodiment the present invention relates to a method of stabilizing an organic material against deterioration which comprises incorporating therein an inhibitor having the following general formula:

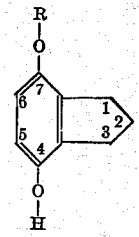

where R is selected from the group consisting of hydrogen, hydrocarbon and substituted hydrocarbon groups.

In a specific embodiment the present invention relates to a method of stabilizing a fatty material which comprises incorporating therein from about 0.0001% to about 1% by weight of 4,7-dihydroxyindane.

In still another embodiment the present invention relates to organic compounds containing a stabilizing amount of the inhibitors herein set forth.

The novel inhibitor of the present invention comprises an indane having a hydroxy group in the 4-position and either a hydroxy or ether in the 7-position. Referring to the general formula hereinbefore set forth, where R is hydrogen, the inhibitor comprises a 4,7-dihydroxyindane. Where R in the above general formula is hydrocarbon group, it may be selected from such groups as alkyl, alkenyl, cycloalkyl, cycloalkylyl, alkylcycloalkyl, aryl, aralkyl, alkaryl, etc. Where R is a substituted hydrocarbon group, it may comprise the groups recited above also containing oxygen, nitrogen and/or sulfur.

Where R is an alkyl group, the inhibitor will comprise a 4-hydroxy-7-alkoxyindane and includes such compounds as 4-hydroxy-7-methoxyindane, 4-hydroxy-7-ethoxyindane, 4-hydroxy-7-propoxyindane, 4-hydroxy-7-butoxyindane, 4-hydroxy-7-pentoxyindane, 4-hydroxy-7-hexoxyindane, etc. Where R is an aryl group the compound will comprise a 4-hydroxy-7-phenoxyindane and include such compounds as 4-hydroxy-7-toloxyindane 4-hydroxy-7-xyloxyindane, etc. Where R is an aralkyl group, the compound will be 4-hydroxy-7-benzyloxyindane, 4-hydroxy-7-phenethyloxyindane, etc.

It is apparent that numerous compounds may be prepared and utilized in accordance with the present invention. However, all these compounds are not necessarily equivalent and may be of different effectiveness in the same or different substrate. It also is understood that a mixture of isomers may be used in order to eliminate the necessity of separating the same. In some cases a mixture of two or more different inhibitor compounds may be employed.

The inhibitor compound of the present invention generally is incorporated in the organic material to be stabilized in an amount of not above about 2% and usually in an amount within the range of from about 0.0001% to about 1% by weight. When used in edible fats and oils, it is understood that the inhibitor compound may be utilized in conjunction with synergists such as citric acid, phosphoric acid, ascorbic acid, etc., and/or in combination with other inhibitors and/or other compounds added for specific purposes. When used in hydrocarbon fractions, it is understood that the inhibitor compound may be utilized in conjunction with other additives which may be incorporated in the hydrocarbon fraction as, for example, dyes, synergists, metal deactivators, antiknock agents, rust inhibitors, etc. The inhibitor of the present invention may be utilized as such or in a suitable solvent, including hydrocarbons, alcohols, glycols, ethers, ketones, etc. When desired, the inhibitor compound may be marketed as a solution along with one or more other additives to be incorporated in the organic material.

The following examples are introduced to illustrate further the novelty and utility of the present invention but not with the intention of unduly limiting the same.

Example I

The lard used in this example had a normal stability period of 4 hours as determined by the Swift test. This test is described in detail in the article by A. E. King, H. L. Roschen and W. H. Irwin, which appeared in "Oil and Soap," vol. X, No. 6, pages 105–109 (1933), and modified as described in the articles by R. W. Reimenschneider, J. Turer and R. M. Spec, which appeared in "Oil and Soap," pages 169–171 (1943). In general this test comprises bubbling air through a sample of lard and determining rancidity organoleptically and by peroxide numbers. The result of these tests is reported as A. O. M. stability period, which is the number of hours required to reach a peroxide number of 20.

0.02% by weight of 4,7-dihydroxyindane was incorporated in a sample of the lard, and this served to increase the stability period thereof to 59 hours.

*Example II*

To another sample of the lard described in Example I, 0.02% by weight of 4-hydroxy-7-methoxyindane was added. This served to increase the induction period of the lard to 26 hours.

*Example III*

In contrast to the 4,7-dihydroxyindane of Example I, and the 4-hydroxy-7-methoxyindane of Example II, 0.02% by weight of 4-hydroxyindane was added to another sample of the lard described in Example I. This served to increase the stability period of the lard to only 5.5 hours. This example illustrates the unexpectedly higher potencies obtained by the dihydroxy or hydroxy methoxyindanes.

We claim as our invention:

1. Method of stabilizing fatty material against deterioration which comprises incorporating therein an inhibitor having the following general formula:

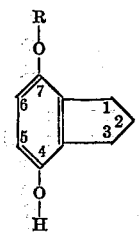

where R is selected from the group consisting of hydrogen and hydrocarbon groups.

2. Method of stabilizing fatty material against oxidative deterioration which comprises incorporating therein a stabilizing amount of 4,7-dihydroxyindane.

3. Method of stabilizing a fatty material against rancidity which comprises incorporating therein from about 0.0001% to about 1% by weight of 4,7-dihydroxyindane.

4. Method of stabilizing a fatty material against rancidity which comprises incorporating therein from about 0.0001% to about 1% by weight of a 4-hydroxy-7-alkoxyindane.

5. A fatty material subject to deterioration in storage containing as an additive to retard deterioration a stabilizing amount of an inhibitor having the following general formula:

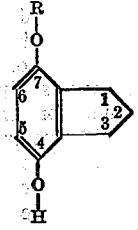

where R is selected from the group consisting of hydrogen and hydrocarbon groups.

6. A fatty material subject to deterioration containing a stabilizing amount of 4,7-dihydroxyindane.

7. A fatty material subject to oxidative deterioration containing a stabilizing amount of a 4-hydroxy-7-alkoxyindane.

8. Fatty material subject to rancidity containing, as an inhibitor to retard said rancidity, from about 0.0001% to about 1% by weight of 4,7-dihydroxyindane.

9. Fatty material subject to rancidity containing, as an inhibitor to retard said rancidity, from about 0.0001% to about 1% by weight of 4-hydroxy-7-methoxyindane.

10. Lard normally tending to become rancid containing from about 0.0001% to about 1% by weight of 4,7-dihydroxyindane.

11. Lard tending to deteriorate in storage containing a stabilizing amount of an inhibitor having the following general formula:

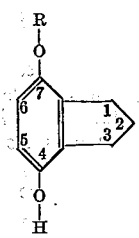

where R is selected from the group consisting of hydrogen and hydrocarbon groups.

12. Lard tending to deteriorate in storage containing a stabilizing amount of an inhibitor having the following general formula:

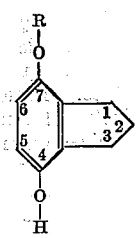

where R is an alkyl group.

References Cited in the file of this patent

UNITED STATES PATENTS

| | | |
|---|---|---|
| 2,110,950 | Burk et al. | Mar. 15, 1938 |
| 2,176,883 | Fisher | Oct. 24, 1939 |
| 2,670,340 | Kehe | Feb. 23, 1954 |